United States Patent
Collins

[15] 3,656,338
[45] Apr. 18, 1972

[54] DEVICE AND METHOD FOR SAMPLING MOLTEN METAL

[72] Inventor: William J. Collins, 7005 Madison Street, Merrillville, Ind. 46410

[22] Filed: Aug. 6, 1970

[21] Appl. No.: 61,625

Related U.S. Application Data

[63] Continuation-in-part of Ser. No. 38,700, May 19, 1970.

[52] U.S. Cl. .............................73/17 R, 73/354, 73/425.4
[51] Int. Cl. ........................................G01n 1/12, G01n 25/04
[58] Field of Search ...................73/421 MM, 425.4, 354, 17; 164/4

[56] References Cited

UNITED STATES PATENTS 3,455,164  7/1969  Boyle ........................................73/354
3,481,201  12/1969  Falk ........................................73/425.4
3,559,452  2/1971  Perbix ........................................73/17

*Primary Examiner*—S. Clement Swisher
*Attorney*—Charles S. Penfold

[57] ABSTRACT

A molten metal sampling apparatus and method of the type in which a sample receiving means is positioned in the end of a cardboard tube intended to be dipped into a body of molten metal. The molten metal after disintegrating an external protective cap flows through a tortous path and divides into two passageways before solidifying in a receiving chamber to form a solid sample. One receiver in each sampling device is provided with a temperature measuring means so that the temperature changes of the sample may be measured.

52 Claims, 28 Drawing Figures

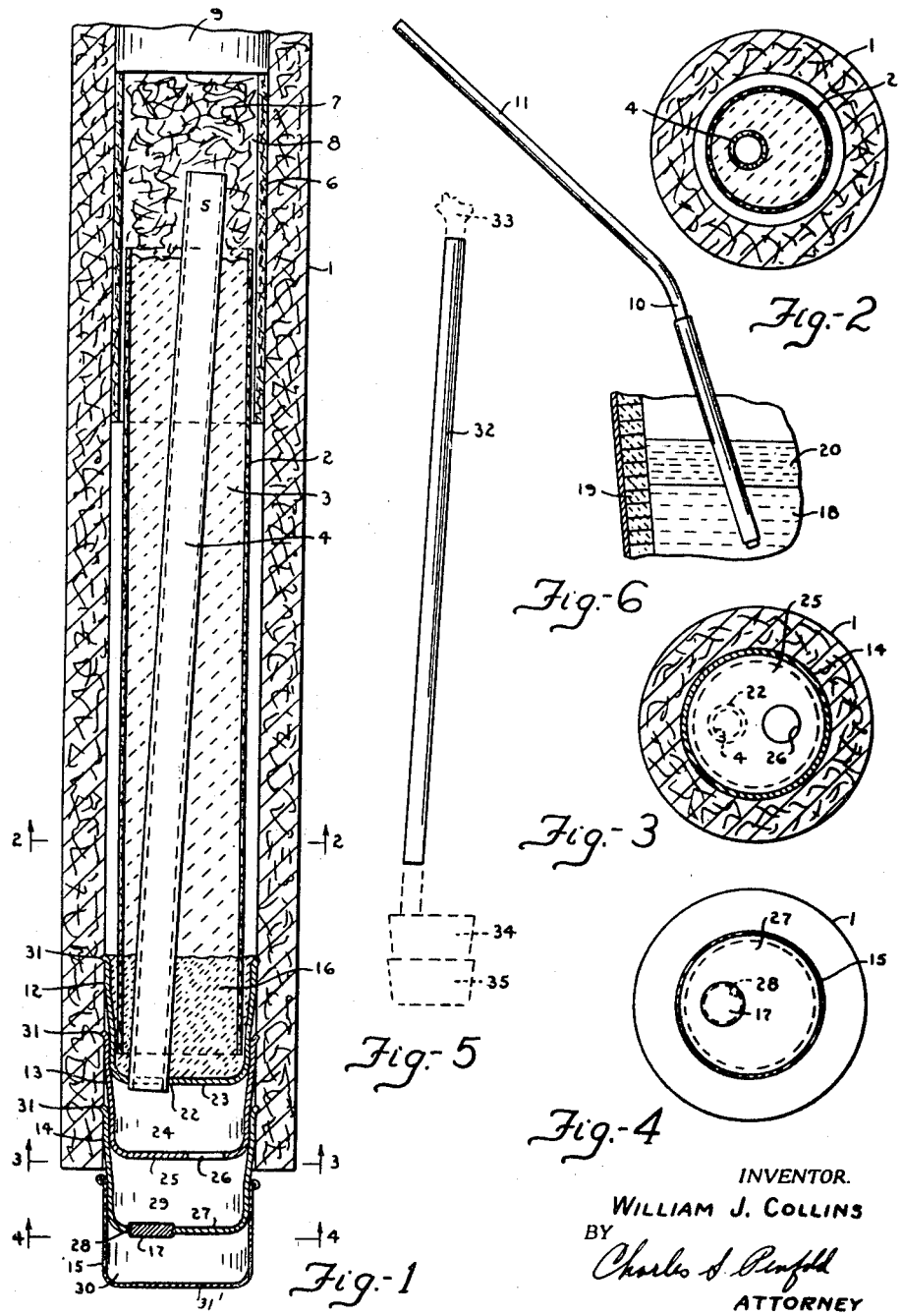

INVENTOR.
WILLIAM J. COLLINS
BY
Charles S. Penfold
ATTORNEY

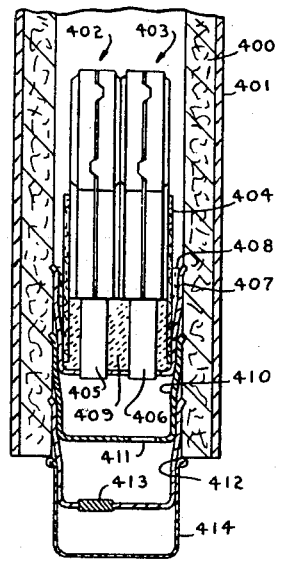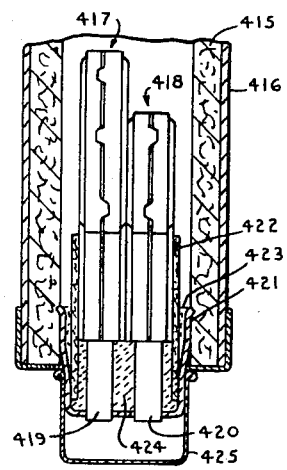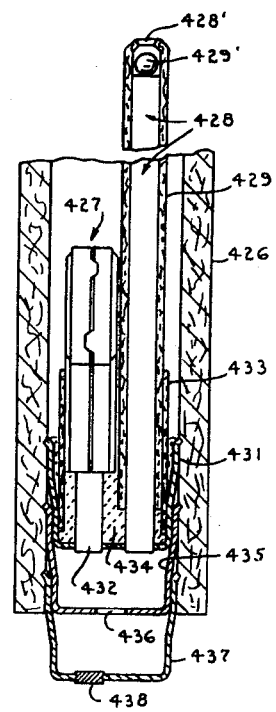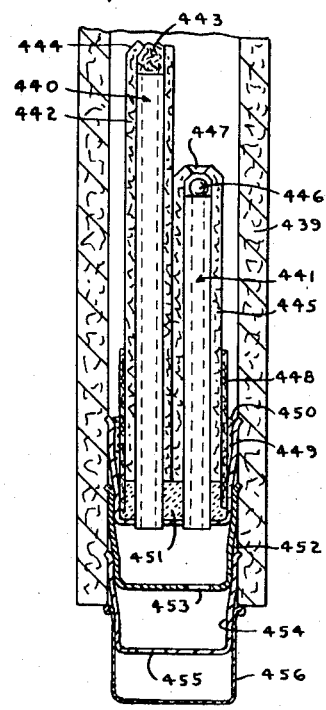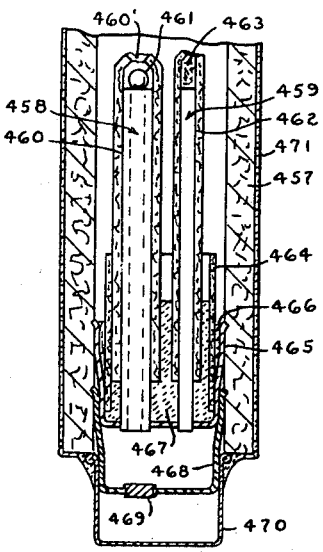

INVENTOR.
WILLIAM J. COLLINS
BY Charles S. Penfold
ATTORNEY

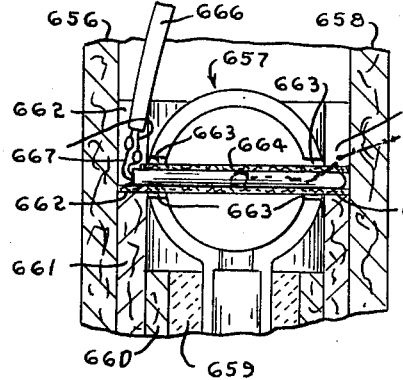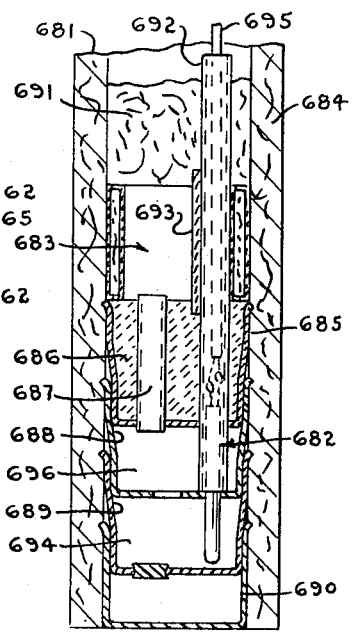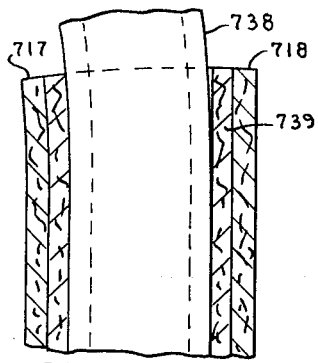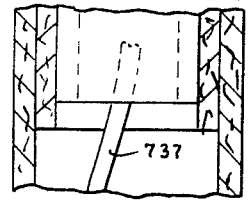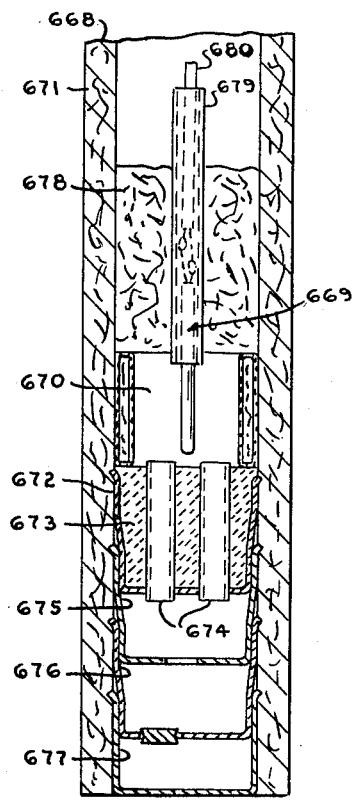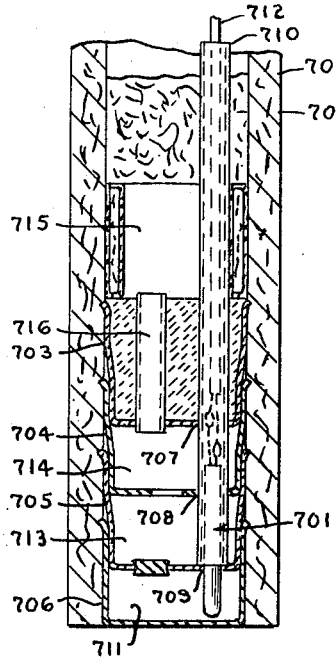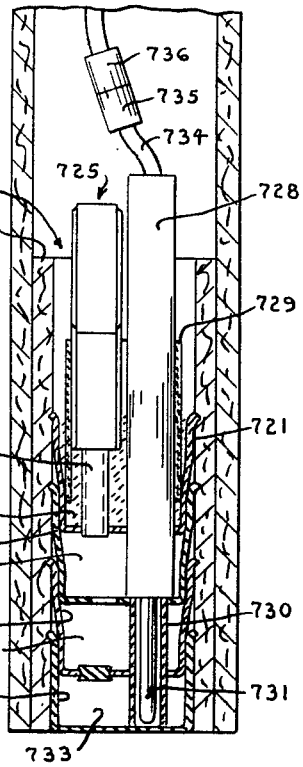
Fig.-23
Fig.-25
Fig.-24
Fig.-26
Fig.-27
INVENTOR.
WILLIAM J. COLLINS
BY Charles S. Penfold
ATTORNEY

DEVICE AND METHOD FOR SAMPLING MOLTEN METAL

This application is a continuation-in-part of my application Ser. No. 38,700 filed May 19, 1970 and is related to an earlier abandoned application Ser. No. 391,654; an application Ser. No. 590,829 now U.S. Pat. No. 3,415,124 and an earlier application Ser. No. 713,640 now abandoned filed Mar. 18, 1968.

The subject invention relates generally to means utilized in conjunction with testing equipment and more particularly is directed to a device which is adapted for use in obtaining a sample of molten metal from a chamber for analysis.

The device may be employed wherever applicable and has proven very efficient and reliable in obtaining samples of molten metal for chemical analysis of all of its elements including the amount of gases, such as oxygen, hydrogen and nitrogen contained therein may be ascertained. The sample may be obtained from any chamber such as an open hearth furnace, a basic oxygen vessel, electric furnace or related metal making facility. The sample obtained may also be tested to determine its physical characteristics.

A specific object of the invention is to provide a receiving means with a vent or valve and/or means within the escape chamber whereby to retard or stop the flow of metal into this chamber while permitting release of the air therethrough.

A further object of the invention is to provide a sampling device whereby an outer housing thereof is completely protected or shielded so that the housing will not explode or cause contamination of the specimen when the device is dipped into molten metal.

A particularly important object of the invention is to provide a device which, among other things, is provided with one or a plurality of receiving means whereby one or a plurality of samples of substantially corresponding or different sizes may be simultaneously obtained.

A significant objective of the invention is to provide a device whereby a thermocouple is operatively associated with one or more receiving means so that the temperature of a hot liquid, such as molten metal, may be readily ascertained during the sampling process.

A specific object of the invention is to provide a modified device having an outer cylindrical tubular housing which has an internal diameter or cross-dimension greater than the majority of housings shown and an upper extremity thereof is provided with means, such as an insert, whereby to compensate for the dimensional differences and facilitate connection of a wand to the device.

Additional objects reside in providing a device which offers advantages with respect to manufacture and assembly, efficiency, durability, safety, and destruction whereby to obtain access to the recovered specimen.

Other objects and advantages of the invention will become apparent after the description hereinafter set forth is considered in conjunction with the drawings annexed hereto.

Referring to the drawings:

FIG. 1 is a vertical sectional view of the device, with an end portion broken away;

FIG. 2 is a transverse section taken substantially on line 2—2 of FIG. 1;

FIG. 3 is a transverse section taken substantially on line 3—3 of FIG. 1;

FIG. 4 is a transverse section taken substantially on line 4—4 of FIG. 1;

FIG. 5 is a view showing a specimen recovered from the device;

FIG. 6 is a view showing at least one mode of manipulating the device for use in obtaining a specimen or specimens from a vessel of molten metal, with only a portion of the vessel being shown;

FIG. 12 illustrates a modified device which is capable of simultaneously receiving a pair or a plurality of samples of substantially the same configuration;

FIG. 13 is a modified device which includes a pair of receiving means which are adapted to simultaneously receive and obtain molten metal samples of different sizes;

FIG. 14 is a modified device having a pair of dissimilar receiving means;

FIG. 15 is a modified structure disclosing a pair of receiving means for obtaining spindle-like samples of variable lengths and in which one of the receiving means may be provided with a filter type vent and the other with a valved vent;

Figure 17:
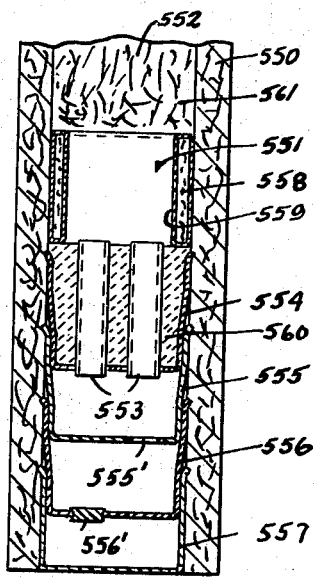
Figure 28:
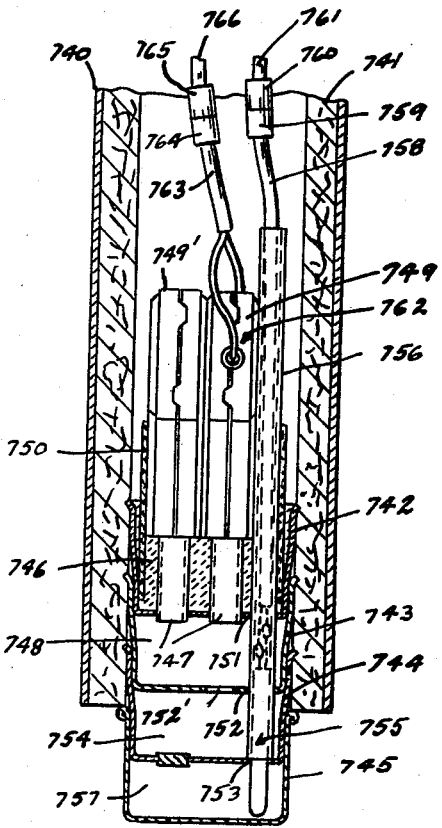
Figure 18:
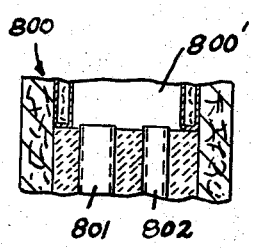
Figure 19:
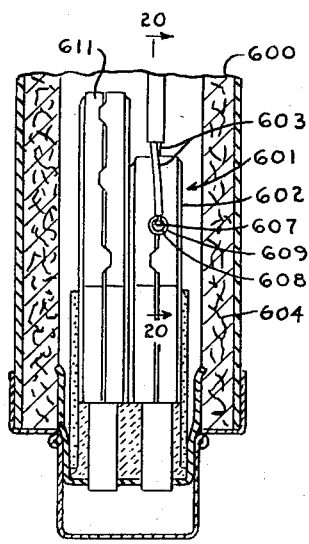
Figure 20:
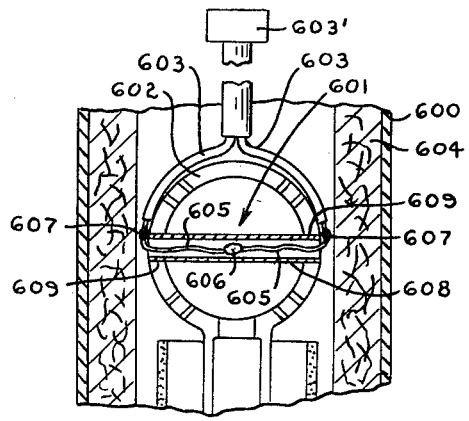
Figure 21:
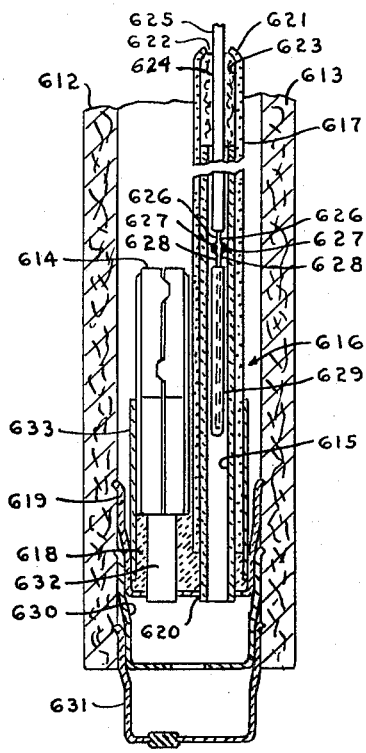
Figure 22:
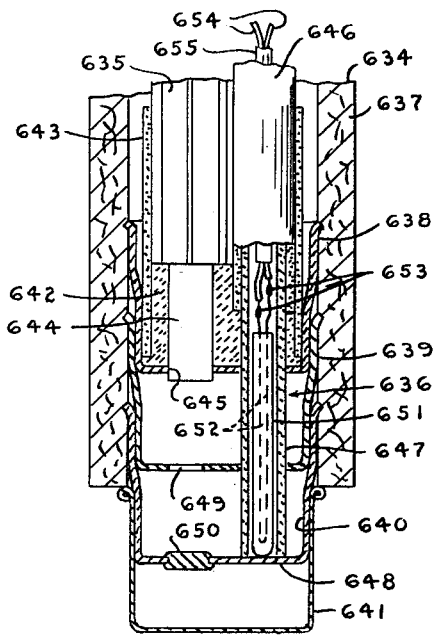

FIG. 16 discloses a structure similar to the FIG. 15, in which the receiving means are substantially of the same length; some of the lower structure of the device has been omitted, and the housing is treated with a heat-resistant material;

FIG. 17 is a vertical section taken through a modified form of device in which a pair of inlets or passages communicatively connect with one or a plurality of receiving means;

FIG. 18 is a partial vertical section of a modified device;

FIG. 19 is a view similar to FIG. 13 and shows a thermocouple operatively associated with one of the receiving means;

FIG. 20 is a vertical section taken substantially on line 20—20 of FIG. 19 depicting certain details of the structure;

FIG. 21 is a view similar to FIG. 14 and shows a thermocouple operatively associated with a receiving means which is adapted to receive a sample of a spindle-like character;

FIG. 22 is similar to FIG. 14 showing a thermocouple in which at least a portion thereof extends below a receiving means;

FIG. 23 is a partial vertical section similar to FIG. 20 showing an alternative way of supporting a thermocouple in a non-supporting relation to a receiving means;

FIG. 24 is a view similar to FIG. 17 showing a thermocouple operatively associated with a receiving means;

FIG. 25 is a view similar to FIG. 24 in which at least a portion of a thermocouple is located below a receiving means;

FIG. 26 is a view similar to FIG. 25 showing thermocouple located in a position somewhat lower than in FIG. 25;

FIG. 27 is a vertical section taken through a modified device showing a unique way of connecting a subassembly or unit to a housing therefor and means for connection with a wand whereby to facilitate manipulation of the device; and FIG. 28 is a vertical section taken through a modified device in which a pair of samples of molten metal may be obtained as well as the temperature thereof.

The disclosures with respect to FIGS. 1 through 11 are for reference purposes only and are not claimed in the subject application.

Referring particularly to FIG. 1, the device preferably comprises an outer elongate cylindrical tubular housing or jacket 1, an inner elongate cylindrical tubular casing 2 surrounding a mass of insulating material 3, an elongate cylindrical tubular member 4 substantially surrounded and carried by the mass and having an upper end 5 extending beyond the mass, a cylindrical tubular part 6 having a lower extremity surrounding an upper extremity of the casing 2 and an upper extremity extending therebeyond and about the end 5 of the member 4 to define a relief or escape chamber 7 which preferably contains a fibrous mass of material 8, and a socket 9 for detachably receiving an offset 10 of a wand 11 whereby the device may be manipulated.

The device shown in FIG. 1 also preferably includes a plurality of stacked cups or members 12, 13, and 14, and end cap or cup 15, a mass of high temperature cement 16 in the cup 12, and a fusible element 17 carried by the cup 14. The aforesaid components or parts will be described more in detail subsequently.

The outer housing 1 may be designed and constructed as desired but is preferably made from heavy cardboard so as to provide a rigid unit for protecting the inner structure substantially contained therein from the high temperature of the molten metal bath for a time sufficient to obtain the sample or specimen. This housing may be made in any size but preferably has an outside diameter of 2 1/16 of an inch, an inside diameter of 1 5/16 of an inch to provide a wall thickness of three-eighths of an inch, and a length of 34 inches. The aforesaid wall thickness has proven satisfactory in use and length in addition to affording sufficient space for the inner structure, serves to provide the socket 9, above referred to, so that a standard or conventional 1 inch pipe, of which the wand 11 is made, may be readily and snugly detachably received in the socket whereby to facilitate manipulation of the device. The wand is preferably of a length in the neighborhood of 10 feet to promote safety in dipping of the device, for example, into a molten steel bath 18 contained in the vessel 19, for penetration through a slag covering or layer 20 to a depth of about 15 or 20 inches as depicted in FIG. 6.

The tubular member 4 and mode of mounting or supporting the same will now be described. This member may be designed and constructed from any material and in any shape suitable for the purpose and provides a chamber or mold for receiving a quantity of the molten metal. More specifically, the member is preferably made from a glass known as Pyrex which will withstand high temperatures. The use of glass has proven particularly advantageous because it can be readily broken to obtain access to the solidified sample following recovery. The length of the member may be varied depending on the type or character of sample or specimen desired. The diameter of the member is preferably 10 millimeters or under in order to promote controlled cooling of the sample. The member may be internally tapered.

The glass tube 4 is preferably supported or imbedded in a diagonal position in the mass of material 3 which serves to protect and impart stability to the tube as well as support it within the confines of the outer casing 1. The mass 3 may be any material suitable for the purpose. Material, such as plaster of paris, has proven very satisfactory in use and in order to facilitate imbedment or molding of the tube 4 in the mass, the latter is preferably molded from a plastic or flowable condition into a solid within the confines of the cylindrical tubular casing 2 as shown in the drawings.

The lower end of the casing 2 and the lower end of the glass tube 4 are preferably secured and sealed into the uppermost cup 12 by utilizing the mass of high temperature cement 16 which surrounds the lower ends of the tube and casing in such a manner that the end of the tube 4 extends through an aperture or port 22 provided in a bottom wall 23 of the cup 12. This opening has an axis which is spaced from the center of the wall.

The cement 16 is preferably of a refractory character and offers protection or insulation against the high temperature of the molten metal and promotes its upward flow in the tube 4, and the same is generally true of the mass 3. Otherwise expressed, the masses 3 and 16 serve to insulate and protect the glass tube and constitute a means whereby to promote or encourage uniform cooling of the molten metal as it travels upwardly in the tube.

The cup 13 is preferably connected to the uppermost cup 12 by a telescoping pressed fit so that the cups 12 and 13 are positioned in a nested sealing relationship and define a chamber 24, with the bottom wall 23 of the member 12 being disposed in axially spaced relationship to a bottom wall 25 of the cup 13. The bottom wall 25 constitutes a partition provided with an aperture or port 26 having an axis disposed in a position spaced from its center.

The cup 14 is preferably adapted to be connected to the cup 13 in a mode corresponding to that connecting the cups 12 and 13 and it has a bottom wall 27 constituting a partition provided with an aperture or port 28 having an axis disposed in a spaced relation to the center of this wall. The fusible means or element 17, above referred to, is preferably made of aluminum and is preferably secured in the aperture 28 by a peening or upsetting operation. It will be observed that the bottom wall 27 of the cup 14 is disposed in axially spaced relationship to the wall 25 of the cup 13 and that these cups define a chamber 29.

The cap 15, above referred to, is also preferably made in the form of a cup and is preferably adapted to be press fitted into nesting relationship with the cup 14 and defines in combination therewith a chamber 30. This cap is preferably made of metal of such a character that it will at least become partially disintegrated or ruptured when immersed in the molten metal. In order to facilitate attachment of the cap to the cup 14, the bottom wall of the cap is preferably provided with a relatively small aperture 31 constituting a vent to prevent the release of air from the chamber 30 when the cap 15 is pressed into the cup.

Attention is directed to that fact that the glass tube 4 is secured in an inclined position in the mass 3; that the lower end of the glass tube 4 and the opening 22 in the bottom wall 23 of the cup 12 are both generally aligned with the opening 28 and the fusible means 17, and that the opening 26 in the bottom wall or partition 25 of the cup 13 is disposed in a staggered or off-center position with respect to the axes of the openings 22 and 28 so that when the cap 15 is disintegrated or otherwise ruptured by the molten metal, the latter will melt the element 17 and thereby allow the metal to successively flow in a tortuous path through the aperture 28 into the chamber 29, the aperture or port 26 into the chamber 24 and thence upwardly into the glass tube 4 and out its upper end 5 into or against the fibrous mass or baffle 8. The element 17 serves to deoxidize the molten metal received in the tube or receiving means 4 or that amount of metal which is expected to form the final specimen. It is believed that this deoxidation serves to promote homogenity. The metal is deoxidized in the chamber 29 and is mixed by turbulence in the chamber 24 prior to entry in the tube 4. Attention is also directed to the fact that the cup members 12, 13, 14 and the cap 15 constitute a fabricated lower chamber structure and that this structure including the casing 2, mass 3 and glass tube 4 are all connected together to preferably provide a subassembly or unit which is adapted to be pressed into connection with the outer housing 1 of the device. More specifically in this regard, the unit or subassembly is adapted to be pressed into the housing in such a manner that sharp edges of rims 31 formed on the cups 12, 13, and 14 will automatically bite or indent themselves into the material defining the internal cylindrical surface of the housing to lock the subassembly in a desired operative position as exemplified in FIG. 1 of the drawings. The cap 15 may be attached to the cup 14 before the subassembly or unit is pressed into connection with the housing as just described, but it is preferably applied to the cup 14 after the other components of the unit have been mounted in the housing. Obviously, the unit may be secured or mounted in other ways. For example, it may be cemented in place.

Referring now to the procedure in obtaining or recovering a specimen, the preferred method comprises plunging or dipping the device into the molten bath, through the layer of slag or impurities 20 so that the lower end of the device is below the layer as evidenced in FIG. 6. The long wand 11 is utilized to manipulate the device and the device is preferably held in the bath for a very brief period of time, for example, a period of from 3 to 10 seconds which causes the cap 15 to be blown free, or otherwise disintegrate or rupture, due to the expanding trapped air in the chamber 30, resulting from the enormous temperature change from, for example, from 70° to 2900° F. of metal bath.

The cap and mass of cement 16 serve to momentarily insulate the interior of the device as it is being inserted into the molten metal and the cap protects the device against the premature admission of any slag and/or any other surface impurities until the lower end of the device is well below the layer 20. As the cup disintegrates or otherwise enables the molten metal to melt the element 17, the latter diffuses into the molten metal for deoxidizing the same and the two are mixed or conditioned as they successively tortuously flow through the apertures or port 28, chamber 29, port 26 and chamber 24 into the glass tube 4. Deoxidation substantially occurs in the chamber 29 and the mixing substantially in the chamber 24, although some mixing does occur in the chamber 29 prior to entry of the metal into the chamber. The metal thus treated, conditioned or deoxidized flows upwardly through the tube and against the fibrous or baffle means 8 in the upper chamber 7, allowing air to pass through the fibrous means while substantially preventing any great quantity of metal to flow into the chamber. After a few seconds or a sufficient time interval has elapsed in order to permit filling of the tube 4, the device is quickly lifted from the bath of molten metal and then may be subjected to a cooling medium, such as cold water, a blast of cool air or it may be placed on a work bench and allowed to cool. In any event, the specimen retrieved from the molten bath is not utilized until after it has solidified and cooled to such an extent that it can be operated on for analysis. The specimen or sample solidifies or begins to solidify while the device is immersed in the molten metal. It is desirable that the analysis of the specimen be obtained expeditiously so that it may be quickly analyzed in order to determine or ascertain whether the molten metal is in accord with preselected or predetermined specifications or requirements. If, for example, the specimen indicates that the molten metal is not of the character desired, then the metal in the vessel 19 may be modified or changed. In some instances, it may become necessary to obtain more than one sample or specimen of the molten metal before the latter is brought up to a required standard.

The device, upon being subjected to the molten metal, deteriorates or becomes damaged to the extent that at least a portion of the outer housing is burned away, charred or disintegrated so that, in some instances, a portion of the mass of material disposed about the glass tube may be visible. Also, the cap 15, in some instances, may be completely disintegrated into the molten metal and in other instances, a portion of the cap may still remain attached to the cup 14. Moreover, in some instances, portions of the cups 13 and 14 may disintegrate. In other words, the disintegration or destruction of various components of the device is dependent to their design and construction, the temperature of the molten metal, and the time that the device is held in the latter.

After the device is removed from the molten bath, the outer housing is cut or otherwise broken apart to obtain the subassembly, after which the tubular part 6, fibrous material 8, mass 3, tube 4, cement 16 and cups 13 and 14 may be removed and/or destroyed in any mode or order desired so that there remains a specimen having an elongate cylindrical portion 32, an end portion 33 and a pair of joined enlarged end portions 34 and 35 as exemplified in FIG. 5. The end portion 33 is formed by metal entering the chamber 7 and the end portions 34 and 35 by the chambers 24 and 29. Any portion of the specimen may be utilized for analysis, but the portion 32 which was formed within the confines of the glass tube is preferably utilized after the end portions 33, 34 and 35 are removed as indicated by the dotted lines.

Figure 7:
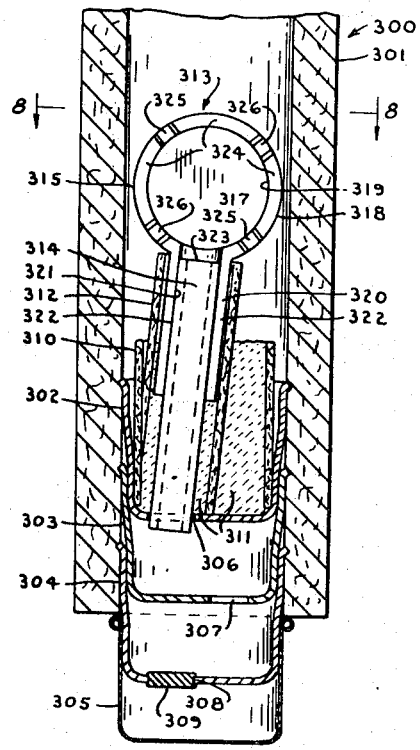
FIG. 7 is substantially a vertical section of a modified and improved device.
Figure 8:
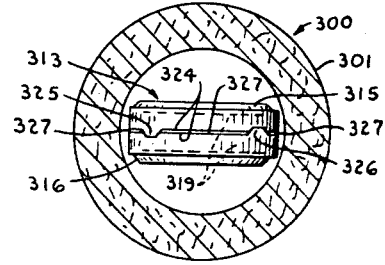
FIG. 8 is a horizontal or transverse sectional view taken substantially on line 8—8 of FIG. 8.
Figure 10:
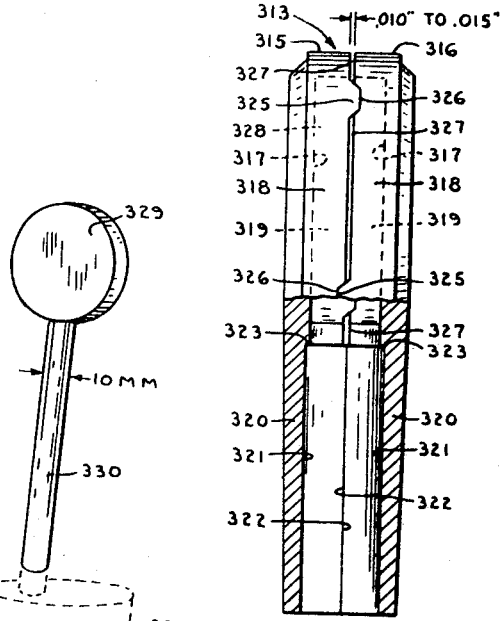
FIG. 10 is a side elevational view of the subassembly shown in FIG. 9.

The modified sampling device as exemplified in the FIGS. 7 and 8 of the drawings, except for variations in the relative sizes and in a reduction in the number of certain components utilized, substantially corresponds to the device previously described.

The device generally designated at 300 shown in FIG. 7 excludes, for example, the part 6 and mass 8 illustrated in FIGS. 1 through 6. More specifically, the device 300 includes an outer jacket or tubular housing 301, constructed of some desirable material such as heavy cardboard, corresponding to the jacket 1 in FIG. 1 and a plurality of cups 302, 303, 304, 305 which are constructed, operatively connected and supported for the same purpose as the corresponding cups shown in FIG. 1.

The bottom wall of the innermost cup 302 is provided with an aperture 306, the bottom wall of the cup 303 with an aperture of 307, and the bottom wall of the cup 304 with an aperture 308 in which is secured a fusible or meltable element 309. It will be observed that aperture 307 is offset with respect to a line extending through the axes of the apertures 306 and 308.

The device 300 also preferably includes a relatively short tube 310 which is preferably firmly secured in the innermost cup 302 by a mass of high temperature cement 311. An inner tube 312 having a diameter less and a length greater than the tube 310 has a lower extremity firmly secured by the cement in the tube 310 and cup 302 and against the bottom wall of the latter in general alignment with the aperture 306. In practice these tubes 310 and 312 are constructed from cardboard, but it is to be understood that any material suitable for this purpose may be utilized. It will be observed that inner portions of the tube 310 and the mass 311 project inwardly beyond the confines of the cup 302 whereby to lend support for the tube 312 and associated components which will now be described.

The device 300 further includes a receiving means or mold structure, generally designated 313, preferably of powdered metal, and an inner tube 314 preferably constructed from Pyrex Glass. It is to be understood that any materials which will withstand high temperatures may be utilized.

The receiving means or mold structure 313 may be designed and constructed in various ways but as exemplified in FIGS. 7 through 10, it is preferably comprised of a pair of half or complementary sections 315 and 316. The tube 312, above referred to, constitutes means for maintaining or holding the sections assembled. Each of the sections preferably includes a relatively large annular portion having a bottom wall 317 and said wall structure 318 which define a pocket or recess 319. Each section also preferably includes an integral radial or tapered lateral continuation 320 provided with a semicylindrical groove 321 extending throughout the length of the continuation. Attention is directed to the fact that continuations have opposed longitudinally extending planar edges 322 and that the inner ends of the groove are provided with abutments 323.

The end surface of each of the wall structures of the sections is planar as indicated at 324 and interrupted by a pair of diametrically disposed projections 325 and a pair of diametrically disposed notches or recesses 326 the latter of which are circumferentially spaced 90° apart from the projections. The receiving means or mold structure 313 is preferably so designed and constructed that when the sections are correctly held in assembled relation by the tube 312 which is telescoped into a snug surrounding relationship with the tapered continuations 320, the opposed planar surfaces 322 of the continuations will be held in intimate bearing relationship and the projections 325 will be disposed in interfitting or interlocking relationship with the notches 326 whereby to maintain the marginal end surfaces 324 of the wall structures of the sections in a predetermined spaced parallel relationship so that preferably a plurality of three circumferentially spaced arcuate vents or openings 327 are provided through which a fluid such as gas or air may escape when the molten metal is received in the mold structure.

Experimentation and testing has proven that the optimum gap, spacing, or size of the vents or openings should be within a range of 0.010 to 0.015 inch for sampling basic oxygen processed steels due to their higher temperatures. More particularly in this respect, it was initially believed that no vent openings were essential on the basis that the heat of the molten metal would cause the mold sections to separate and release the trapped gases. However, failures did occur in practice so tests were conducted which proved that the size of the vent or vents was critical. It was discovered that a relatively small vent or a narrow gap between the large portions of the sections caused back pressure and restrained the molten metal from entering and completely filling the receiving means or mold cavity. It was further discovered that a vent of relatively large size or an excessive gap between the large portions of the sections caused the molten metal to bleed through the vent and seal the sections together thereby resulting in obtaining a porous test sample of poor quality. Further, exhaustive tests support the conclusion that a gap between opposed surfaces of the large portions of the sections within a range of between 0.010 to 0.015 inch is the most efficient insofar as sampling basic oxygen processed steels in view of their higher temperatures.

Attention is directed to the fact that the projections and notches constitute means which assist in assembling, locating, aligning, or placing the sections in registry; that the pockets 319, in combination, define a chamber 328 which finally receives the molten metal; that the longitudinal grooves 321 in the continuations, in combination, define a tubular formation or socket which snugly receives one extremity of the glass tube 314 which engages the abutments 323 for limiting inward movement of the tube; and that the lower extremity of the glass tube extends beyond the continuations and through the aperture 306 in the cup 302, and is secured in place by the surrounding cement 311 in the tube 312. It will be apparent that the tube 312 is also firmly anchored in place by the cement 311; that the cement within the confines of the tube 312 assists in sealing and securing the glass tube in the socket, the inner ends of the continuations together and the glass tube in the aperture 306 so that the molten metal will flow only through the glass tube prior to reception in the chamber 328 of the receiving means 313. It will be observed that the longitudinal axes of the receiving means 313, glass tube 314 and the tube 312 are coincidental and inclined with respect to the longitudinal axis of the outer jacket 301. It is to be understood that the device may be made in which the aforementioned axes may be in alignment with the longitudinal axis of the jacket or parallel thereto.

Figure 11:
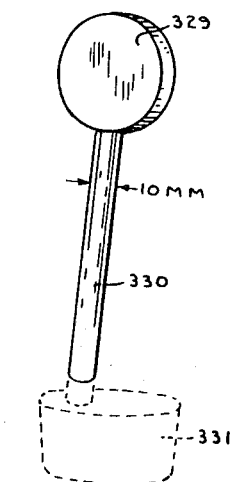
FIG. 11 is a perspective view showing the resultant sample obtained by utilizing the device.
Figure 9:
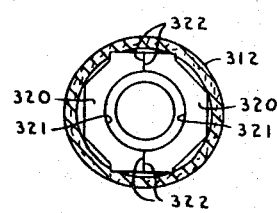
FIG. 9 is an end view of a subassembly of certain components utilized in the device shown in FIG. 7.

The device has proven most efficient in use in obtaining a precision case circular disc 239 attached to a 10 mm. diameter stem 330 as exemplified in FIG. 11. Due to the circular shape of the disc, the sample is unilaterally cooled, promoting an equiaxilar columnar grain structure which is beneficial to chemical and physical analyses. Further, the shape and thickness of the disc-like portion 329 of the sample and its resultant structural characteristics offers an ideal section for spectrographic analysis in addition to those just referred to. Moreover, the stem of the device has been designed and constructed for gas or carbon analysis. The material and mass of the mold determine the cooling characteristics of the resultant cast sample.

After the sample more or less in a lollipop form has been cast, certain of the various components such as the sections 315 and 316, glass tube 314 may be readily separated, destroyed, disintegrated, or broken apart so as to obtain the sample structure exemplified in FIG. 11 after which that portion 331 illustrated in dotted lines may be removed so that the remainder of the lollipop like sample may be subjected for analyses as above described.

In view of the foregoing, it should be manifest that the structure illustrated in FIGS. 7 through 10, among other things, comprises an outer jacket or housing 301; an inner tube 314 which is supported by a mass of material 311 which is highly resistant to heat deterioration; that the means 313 is disposed within the confines of the housing and is provided with a chamber 328 which communicatively connects with the upper end of the tube 314; that means which may comprise one or more of the cups 302, 303, 304 provide at least a second chamber which communicatively connects with the lower end of the tube 314 for initially receiving a liquid for transmission into said tube and the chamber 328; and what means, such as the fusible element 309, serves to condition the fluid in the second chamber prior to its reception into the tube 314.

The device depicted in FIG. 12 offers a unique setup whereby a plurality of corresponding samples may be simultaneously obtained from a bath of molten metal and provision is made for maintaining the receiving means and the components thereof in their respective correct operative positions.

More particularly, the device preferably comprises a non-metallic tubular housing 400 and an outer metal protective shield or casing 401 which completely surrounds the housing. A pair of receiving means generally designated 402 and 403 of substantially the same design and construction are disposed within the confines of the housing and since each substantially corresponds to the receiving means illustrated in FIG. 7 of the drawing, a further detailed description thereof is considered unnecessary. A tubular sleeve or jacket 404, preferably of a non-metallic material, such as cardboard, surrounds lower extensions of the receiving means whereby to maintain the receiving means and the components of each assembled with respect to one another, with the receiving means preferably in abutting relationship to improve the structural stability of the device.

A pair of tubes 405 and 406, preferably constructed of a refractory material highly resistant to heat, such as Pyrex, have upper ends which are respectively telescopically received in the receiving means and lower ends which extend through apertures provided therefor in a base wall of an upper cup 407. It will be observed that the lower end of the sleeve 404, that lower ends of the receiving means, and the tubes 405 and 406 are disposed in the cup 407. A mass of insulating material or cement 408 is disposed in the cup 407 about the sleeve 404, with an additional mass of insulation, refractory material, or cement 409 disposed in the cup and sleeve 404 and about the tubes 405 and 406, all for the purpose of maintaining the receiving means, tubes and cup 407 assembled as a unit.

The device shown in FIG. 12 offers a setup whereby a plurality of identical samples or specimens may be obtained from a single molten metal bath. More specifically, the heads of the samples provide four planar surfaces or faces for comparative spectrographic, radiographic or wet chemistry analysis and the stems of these samples provide for various combinations of gases and/or wet chemistry analysis. If desired, one of the samples may be used for physical or metallographic study while the other is being analyzed for chemical and/or gas analysis. The physical analysis includes the factor of conducting a hardness test (Brinell or Rockwell), correlated with carbon content to provide a very rapid and easy method for carbon determination of the sample. Other factors include testing for tensile, impact, magnetic or other procedures whereby to provide a rapid and easy method for element determination of ferrous or non-ferrous baths.

Also, the use of a pair of chambers enhances obtaining at least one good sample from each immersion.

The unit may also include a second cup 410 having a bottom wall provided with an aperture 411; a third cup 412 having a bottom wall provided with an aperture normally plugged by a deoxidizing element 413; and a cup or cap 414. The cups 407, 410, 412, and cup 414 substantially correspond and are mounted in accord with those respectively identified as 302, 303, 304 and 305 in FIG. 7 of the drawings. The unit is preferably press fitted into the housing 400 substantially as described above. Although the drawing shows a steel tube, sleeve or jacket encasing the housing 400, the sleeve may or may not be required depending upon the reaction characteristics of the metal into which the device is immersed.

It should be observed that the deoxidizing element 413 is common to both of the entrances 405 and 406 or otherwise serves to condition a pair of samples or specimens. If desired, the element may be made of a larger size or a pair of elements may be utilized for jointly or respectively conditioning a pair of specimens.

The device illustrated in FIG. 13, preferably comprises an outer non-metallic tubular housing 415 and a metal tubular shield 416 surrounding the housing. A pair of receiving means generally designated 417 and 418 are disposed within the confines of the housing 415. It will be observed that the receiving means 418 substantially corresponds to the receiving means 402 and 403, above referred to, and that the receiving means 417 is similar but has a larger upper extremity or head than the upper extremity or head of the receiving means 418.

A pair of tubes 419 and 420 preferably non-metallic, have upper ends which are respectively telescopically received in lower tubular extremities of the receiving means 417 and 418 and lower ends which extend through holes provided therefor in a bottom wall of an upper cup 421. An upper extremity of a tubular sleeve 422, corresponding to the sleeve 404, above referred to, surrounds the lower tubular extremities of the receiving means 417 and 418 and its lower end is disposed and held in the cup 421 by a surrounding mass of cement 423 and a mass of cement 424 disposed in the cup and sleeve and about the tubes 419 and 420 for maintaining the receiving means, sleeve, cup 421 and tubes 419 and 420 assembled as a unit or subassembly for securement in a centralized position in the housing 415. The unit may be secured in place in any manner desired but is preferably secured by forcing the unit into the housing so that a lip of the cup 421 will bite into an inner surface of the housing 415. The unit or subassembly may also include a second or lower cup or cap 425 and this cup is preferably held in a telescopic relation to the upper cup 421 by a press fit. If desired a third cup may be included. A ferrule 426 may be provided about lower portions of the housing 415 and the shield 416 for engaging their lower marginal edges, with an upper bead portion of the lower cap 425 abutting an inturned portion of the ferrule in a manner whereby to assist in holding the latter in relation to the housing and shield. Obviously, the shield and ferrule may be secured in place by press fits or by indentations.

The advantages with respect to the device shown in FIG. 13 enables one to obtain two similar but differently shaped samples at substantially the same time.

The device depicted in FIG. 14, among other things, preferably comprises an outer non-metallic housing 426 and a pair of dissimilar receiving means generally designated 427 and 428 which are disposed within the confines of the housing. The receiving means 427 substantially corresponds to the receiving means 402, 403, and 418, above referred to, and the receiving means 428 is preferably in the form of a glass tubular element constituting a chamber which serves to obtain a spindle or rod-like sample, as distinguished from the lollipop type obtained from the receiving means 427. The receiving means 428 is preferably in the form of a glass tube and a tube preferably of insulating material 429 surrounds the tube 428. The lower end of the tube 428 extends through an aperture provided in a bottom wall of an upper cup 431 and a shorter tube 432, preferably of glass, is secured in a lower extremity of the receiving means 427 and has an end disposed in another aperture in the bottom wall of the cup 431. The upper end of the tubes 428 and 429 are preferably constructed to provide a vent chamber having an outlet 428' controlled by a ball valve 429'. The valve serves to release air as the receiving means fills and assists in sealing the sample during its solidification as the tube 428 fills. The ball valve represents only one technique which may be used to automatically vent the receiving means 428.

A sleeve 433, preferably of cardboard, surrounds at least the lower portion of the receiving means 427 and 428 and at least portions of the tubes 429 and 432. This sleeve serves to maintain the components of the receiving means assembled and the receiving means substantially in an abutting or juxtaposed relationship. A mass of cement 433 is disposed in the cup 431 and surrounds the lower portion of the sleeve 433 and cement 434 is disposed in the sleeve and about the lower portions of the receiving means and tubes 429 and 432 for maintaining the receiving means, tubes, sleeve and cup 431 assembled to constitute a unit which may be press fitted into the housing 426 in a manner described above. The unit may include a second cup 435 having a bottom wall provided with an aperture 436 and a lower cup 435 having an aperture therein within which is received a deoxidizing element 438. It will be observed that the cups are each provided with a lip which bites into the housing 426 whereby to further assist in holding the unit and the housing assembled.

While in most applications three cups, such as 431, 435, and 437 are employed, it is to be understood that if desired, a protective cup or cap such as 414, as exemplified in FIG. 12, may be employed. The protective cup or cap serves to momentarily protect the deoxidizing element or fuse 438 when sampling different types of molten metal or liquids at various temperatures. In some instances, one or more of the cups or cap may be eliminated thereby decreasing the number of chambers through which the metal flows before finally reaching the receiving means. It should be also understood that different materials of the different components may be utilized and in some instances, a deoxidizing element, fuse or plug may be eliminated depending on the characteristics of the molten metal or liquid to be sampled.

The device illustrated in FIG. 15 offers a setup whereby samples of a spindle-like character in different lengths may be obtained. More specifically, the device preferably comprises an outer tubular housing 439 and a pair of receiving means generally designated 440 and 441 disposed within the confines of the housing. The receiving means 440 is preferably in the form of a cylindrical non-metallic tube, such as Pyrex, which is substantially surrounded by a tubular sleeve 442, preferably constructed of pasteboard or equivalent material. The upper end of the sleeve preferably extends beyond the upper end of the receiving means or tube 440 and defines a chamber containing a filter 443 through which air may be vented when molten metal flows upwardly into the tube. The upper end of the sleeve is preferably inturned as indicated at 444 whereby to assist in holding the filter in place.

The receiving means 441 is preferably in the form of a glass tube or equivalent material and a tubular sleeve 445 substantially surrounds the tube and has an upper end which extends beyond the upper end of the tube to form a chamber having a ball valve 446 therein which serves to substantially control or regulate the venting of air through an outlet 447 in the sleeve when molten metal flows upwardly into the tube and thereby assists in obtaining a sample of greater density and uniformity. It will be observed that the tube 440 and its sleeve 442 are somewhat longer than the tube 441 and its sleeve 445 and that the ball also serves to chill the molten metal to solidification as the tube fills.

A tubular cylindrical member 448 surrounds the lower extremities of the tubes 440 and 441 and the sleeves 442 and 445 whereby to assist in maintaining these parts assemble with the sleeves in abutting relationship. The lower ends of the receiving means, sleeves, and the lower end of the cylindrical member 448 are disposed in an upper or first cup 449. Cement 450 surrounds the member 448 and cement 451 is disposed in the lower end of this member 448 and about the lower ends of the tube receiving means for holding these parts assembled as a unit with the lower ends of the receiving means disposed in apertures provided therefor in a bottom of the cup. The unit may also include a second cup 452 provided with an aperture 453, a third cup 454 having an aperture 455 therein, and a fourth or lower cup or cap 456. The cups are adapted to be assembled together in a nesting relationship and to the housing in a manner described above.

The device illustrated in FIG. 16 offers a setup whereby samples of a spindle-like character and substantially of equal lengths but having different diameters may be substantially simultaneously obtained. More particularly, the device preferably comprises an outer tubular housing 457 and a pair of receiving means generally designated 458 and 459, preferably in the form of glass tubes are disposed within the confines of the housing. A sleeve 460 surrounds the tube 458 and their upper ends form a chamber provided with an outlet 460' and a ball valve 461 in the chamber controls the venting of air through the outlet. The tube 459 is surrounded by a sleeve 462 having an upper end which extends beyond the tube and defines in combination therewith a vented chamber having a filter 463 secured therein by an inturned portion of the sleeve. It will be observed that a tubular cylindrical member 464 surrounds the tubes 458 and 459 and the sleeves 460 and 462 and that the lower ends of the tubes respectively extend beyond the lower ends of the sleeves and through apertures provided therefor in a bottom of an upper or first cup 465. Cement 466 surrounds the lower end of the member 464 and cement 467 is disposed in the lower end of the member 464 and about the lower ends of the tubes and sleeves whereby to maintain these components assembled as a unit for positioning in the housing 457 in a manner as described above. This unit may also include a second or intermediate cup 468 having an aperture in its bottom wall normally closed by a deoxidizing element 469 and a third or bottom cup or cap 470. Also, if found desirable, a coating or layer of ceramic or insulating material 471 may be applied to the housing and at least partially about the cup 470 for protective purposes. Some impregnation of this material into the housing may occur.

In view of the foregoing it will be manifest, among other things, that various forms or types of receiving means may be utilized and that each receiving means, whether of a lollipop or cylindrical shape, define a chamber and that each of the chambers is provided with an entrance, opening, or passage through which a portion or sample of the molten metal will flow into the chamber.

It will also be evident that a plurality of receiving means of corresponding or different characters may be supported in housings of corresponding or different characters whereby corresponding or different samples may be simultaneously obtained for the uses desired.

It will further be observed that each of the devices is preferably provided with one or a plurality of means which serve to temporarily protect the entrance or entrances to receiving means, so that for example, slag or other foreign material will not contaminate the sample or samples to be obtained. The protective means preferably utilized comprise one or more cups, caps, or enclosures.

Additional attributes or important factors reside in providing a supporting means which is common to a plurality of receiving means; protective means which may be applicable to a single or a plurality of receiving means and is preferably of a disintegrable character; means, such as a deoxidizing element, which may be utilized to condition one or a plurality of samples of molten metal prior to its entry into one or more receiving means; an improved valve means and various forms of filter means whereby to obtain desirable samples for analysis.

The device depicted in FIG. 17 will now be described. This device is unique in design and construction and preferably includes an elongated frangible or non-metallic tubular housing 550, a receiving means generally designated 551 defining an upper chamber, a venting chamber 552, a pair of glass tubes 553 and rimmed cups 554, 555, 556, and 557. The tubes or tubular means are preferably constructed from Pyrex glass but may be constructed of any desirable frangible material for the purpose and the cups are preferably constructed from metal. These tubes, as alluded to above, also constitute means for receiving metal or other material for sampling and analysis and the same is correspondingly true of a lower chamber defined by the cup 555.

The receiving means 551 is preferably in the form of a tube or cylindrical ring 558 of suitable frangible material, such as cardboard, which is protected or enclosed by a layer or coating of ceramic, insulating, or frangible material 559 so that at least the interior surface of the ring is protected. There may be some impregnation of the ceramic or insulating material into the receiving means depending on the character of these materials. The ring may be of moulded glass or ceramic material. The cross-sectional dimensions of the receiving means and housing are such that the receiving means may be readily press-fitted into the housing. However, if so desired, it may be cemented or otherwise anchored in place.

The cup 555 is provided with an aperture 555' through which the metal flows into the chamber defined by this cup prior to its entry into the tubes 553. The cup 554 preferably contains a mass 560 of cement or insulating material which surrounds and fixes the tubes 553 so that their lower ends respectively register with or extend through apertures provided therefor in the bottom wall of the cup, and their upper ends project slightly above the mass and more or less into the receiving means 551 for communication therewith. Otherwise expressed, the tubes define passages leading to the means 551. The receiving means may rest against the mass or may be arranged to engage the cup 554.

The venting chamber 552 is directly above and communicates with the receiving means 551 and preferably contains a filter 561, such as a mass of steel wool, whereby to assist in retaining the sample in the receiving means for solidification while allowing air to escape as the metal flows from the lower chamber into the receiving means via the tubes 553.

It will also be observed that all of the cups are press-fitted into a nesting relationship and in combination with the cement and tubular means constitute a unit which is preferably press-fitted to a position substantially within the confines of the housing with the rims of the cups biting into the housing for locking the unit in place. The cup 556 is preferably provided with a deoxidizing element 556' and the bottom cup 557 serves to protect or otherwise prevent slag from entering into the device prior to its conditioning by the element. It should also be observed that the cup 556 also forms a chamber which communicates with the chamber defined by the cup 555 through the aperture 555'. When the device is dipped into a bath of molten metal it will successively flow into the cups 556, 555 and into the receiving means 551 through the tubular means 553 and when the device is withdrawn and the samples solidify they will include a pair of masses corresponding to the shapes of the cups 556 and 555, a pair of spindles or stems corresponding to the interior of the tubular means 553 and a mass corresponding to the shape of the receiving means 551. The housing 550, cups, insulating material 560, tubes 553 and receiving means 551 may be readily broken away, destroyed, or separated to obtain access to the mass.

Thus, FIG. 17 discloses a device having a receiving means, such as the chamber 551; receiving means, such as the tubes 553 and the chamber formed by the cup 555 and FIG. 18 shows a receiving means 800', the tubes 801 and 802 and a receiving means or chamber below these tubes which may initially receive metal for flow into the tubes. The term "receiving means" is to be construed broadly and as applied to FIGS. 17 and 18 may include one or a pair of upper means or chambers for receiving a hot liquid such as molten metal or a pair of receiving means as disclosed in FIGS. 12 through 16 of the drawing.

In FIGS. 19 and 20 there is disclosed a device 600 which substantially corresponds to the device illustrated in FIG. 13, except that a thermocouple generally designated 601 is depicted as extending transversely through or into a receiving means 602. The thermocouple is utilized to measure the freezing temperature of the sample. As the freezing temperature of steel is a function of the carbon content, a measurement of this temperature can be converted to carbon content to provide an immediate carbon analysis of the steel bath during the sampling procedure, thereby saving time over the analytical method. This factor is important because modern steel producing furnaces reduce the carbon content of the molten bath so rapidly that instantaneous measurements of the bath are necessary to satisfactorily arrive at the desired end point for the finished steel. The freezing temperature analysis is applicable to all baths of ferrous or non-ferrous metals.

Referring more particularly to the structure shown in FIGS. 19 and 20, a pair of compensating insulated lead conductors 603 are preferably adapted for connection with an instrument, such as a potentiometer 603', disposed at a remote location whereby the voltage may be measured and recorded. These conductors are housed in a conduit and extend downwardly into an outer tubular housing 604. A pair of thermocouple wires 605 extend transversely or diametrically through the receiving means 602 and their inner ends are united by a junction 606 and their outer ends at 607 to the lead conductors 603. The thermocouple wires 605 are preferably disposed in a Pyrex or quartz tube 608, the latter having ends which are disposed in mating notches 609 provided in half sections of the receiving means for locating purposes. The junction 606 is the hot junction or sensor of the thermocouple and is protectively located in the center of the tube 608 and receiving means 602 whereby the molten metal flowing into the receiving means will substantially surround the tube and junction of the thermocouple for achieving maximum sensitivity while a sample of metal is also being obtained in an associated receiving means 611. It should be observed that the thermocouple wires are not supported by the receiving means and extend loosely through the tube 608.

FIG. 21 of the drawing discloses a device 612 which is similar to the device depicted in FIG. 14 and includes an elongated cylindrical tubular outer housing 613, a receiving means 614 and a receiving means 615 having a thermocouple generally designated 616 operatively associated therewith.

More particularly, the receiving means 614 and 615 and thermocouple 616 are arranged in the housing 613 and the receiving means 615 is preferably in the form of an elongated cylindrical tube made of Pyrex or glass and disposed in an elongated cylindrical casing 617 of pasteboard or equivalent material. It will be observed that the lower end of the casing 617 is anchored in a mass of cement 618 contained in an upper cup 619 and that the lower end of the receiving means or tube 615 extends below the lower end of the casing 617 and is embedded in the cement whereby to assist in anchoring the receiving means and casing in place and so that the lower end of the tube is located in an opening 620 provided therefor in a bottom wall of the cup 619. It should also be noted that the upper end of the casing 617 is preferably provided with an upper end wall 621 having an opening 622 therein and that the upper end of the receiving means is inset from the end wall 621 so as to provide a chamber 623 preferably containing a filter of fibrous material 624. A conduit 625 containing a pair of conductors 626 extends longitudinally downwardly into the housing 613 through the opening 622 and filter 624 and into the casing 617 and receiving means 615 and the conductors are joined at 627 to the ends of thermocouple wires 628 encased in a sheath, element or capsule 629 of the thermocouple. The conduit 625 and conductors therein also extend outwardly through the housing 613 for connection with a potentiometer not shown. It should be observed that the filter 624 preferably assists in supporting the conduit and thermocouple and particularly the latter in a predetermined position or location so that some of the molten metal may flow into the lower extremity of the receiving means 615 and against and about the thermocouple whereby to promote an accurate reading and measurement of the voltage for obtaining the temperature of the material being sampled and during the time that molten metal also flows into the adjacent receiving means 614.

In addition to the foregoing, attention is directed to the fact that the device 612 is also provided with a pair of additional cups 630 and 631 which respectively correspond to the cups 435 and 437 shown in FIG. 14 and that the receiving means 614 includes a tubular extension 632 which is embedded in the cement 618 and that the lower extremities of the receiving means 614 and 615 are surrounded by a tubular member 633 which has a lower end embedded in the cement. It should be noted that the filter 624 prevents any inflow of molten metal into the chamber 623 and that the opening 622 may also serve as a vent to allow for the escape of any air from the receiving means and chamber as a result of the inflow of molten metal into the receiving means 615.

In FIG. 22 of the drawing, there is shown a device 634 which, among other things, is provided with a receiving means 635 and a thermocouple generally designated 636. More particularly, the device 634 includes an outer elongated tubular cylindrical housing 637 constructed of a suitable material such as pasteboard, and a plurality of cups 638, 639, 640 and a cup or cap 641 which substantially correspond to and are mounted in substantially the same manner as those in FIG. 12 of the drawing. Otherwise expressed, the cups 638 through 641 are press-fitted to constitute a nested subassembly or unit with the rims of the cups 638, 639, 640 more-or-less biting into an interior cylindrical surface of the housing whereby to firmly secure the unit in place and so that if so desired, the rim of the cup or cap 641 may engage the lower end surface of the housing 637 in order to assist in preventing entrance of molten metal or any other liquid into the housing.

The upper cup 638 contains a mass of insulating cement 642 and the lower end of a cylindrical tube 643, preferably constructed of pasteboard is embedded in the cement. The receiving means 635 is substantially the same as the receiving means 614 shown in FIG. 21 and includes a cylindrical tubular member or extension 644 preferably constructed of Pyrex which is also embedded in the cement 642 and extends into a hole 645 provided in a bottom wall of the upper cup 638.

An elongated tubular cylindrical member 646 has a lower end which is also embedded in the cement 642 and an elongated cylindrical tubular element 647, preferably constructed of Pyrex or equivalent material has an upper extremity supported in the member 646 and extends downwardly through aligned apertures respectively provided in the bottom walls of the cups 638 and 639 with its lower end resting upon or engaging a bottom wall 648 of the cup 640. It should be noted that an intermediate portion of the tubular element 647 is also anchored in the cement 642 whereby to stabilize its position. The bottom wall of the cup 639 is also provided with an aperture 649 which is aligned with the tubular extension 644 of the receiving means 635 and the bottom wall 648 of the cup 640 is provided with an opening in which is secured a fusible element 650 which serves the same purpose as the elements in FIGS. 1, 7, 12, 14, 16, 17 and 21 of the drawing.

The thermocouple generally designated 636 includes an elongated sheath, receptacle or element 651 containing wires 652 having a pair of ends which are joined at 653 to a pair of conductors 654 which are housed in a conduit 655. This conduit and conductors extend outwardly through the tubular element 647, member 646 and the housing 637 for connection with a recording apparatus such as a potentiometer as illustrated in FIG. 20 whereby the temperature of the metal, particularly that which flows into the cups 640 and 639 and about the element 647 and thermocouple may be recorded. It should be observed that the tubular element 647 is not primarily intended to receive molten metal or other hot liquid.

FIG. 23 depicts a device 656 which, among other things, comprises a pair of receiving means similar to those shown in FIG. 19 and only one of the receiving means generally designated 657 is shown mounted in a housing 658. More specifically, the receiving means is shown as having a lower tubular extremity which is embedded in a mass of cement 659 contained in a tubular member 660. This member may be secured in position by utilizing an inner sleeve 661, the latter being anchored in the housing by utilizing any suitable means, such as an adhesive or staples. The tubular member is preferably elongated so that an upper extremity thereof extends above the mass of cement and the sleeve and is preferably provided with a pair of diametrically disposed corresponding notches 662.

The receiving means 657 is preferably comprised of half sections and the circumferential wall of each is preferably provided with diametrically disposed mating notches 663 which when brought together define openings through which the ends of a tubular element 664 constructed of glass or equivalent material extend for support in the notches 662 provided in the member 661. It should be observed that the openings, provided by the mating notches 663 have a diameter greater than the outside diameter of the tubular element 664 so that the latter is supported by the tubular sleeve 661 and not by the receiving means. A pair of thermocouple wires extend lengthwise through the tubular element 664 and their inner ends are joined by what is generally referred to as a hot junction 665. A conduit 666 extends downwardly into the housing and contains a pair of lead in conductors 667 which are joined to the outer ends of the thermocouple wires as clearly shown. It should be noted that the hot junction 665 is located centrally of the upper enlarged part of the receiving means so that it will efficiently respond to the temperature of the molten metal flowing into the receiving means. Otherwise expressed, the hot metal substantially surrounds the tubular element 664 and since the hot junction is located in the center thereof and in the mass of molten metal being sampled in the receiving means 657 and the adjacent receiving means an efficient reading of the temperature thereof may be readily ascertained by measuring the voltage through an instrument located remote from the device and connected to the conductors 667. The operation of the device 656 substantially corresponds to that of the device shown in FIGS. 19 and 20. It should be noted that the edge portions of the cylindrical walls of the half sections are planar for engagement so that the openings formed by the notches may constitute vents.

FIG. 24 depicts a device 668 which is similar to FIG. 17 and the improvement primarily comprises mounting a thermocouple generally designated 669 in operative relationship with a receiving means 670. More particularly, the device includes a housing 671 within which is located in the receiving means, a cup 672 containing cement 673 in which a pair of tubular members 674 are embedded, a pair of cups 675 and 676, a cup or cap 677 and a filter 678, all of which substantially respectively correspond to the same components shown in FIG. 17.

An upper portion of the thermocouple is preferably secured in a tubular member 679 which extends through the filter 678 and is preferably supported thereby so that a lower extremity of the thermocouple may extend below the filter and into a chamber formed by the receiving means 670. A pair of lead in conductors contained in a conduit 680 are adapted for connection with a remote recording apparatus and extend downwardly into housing 671 and the tubular member 679 and connect with the wires of the thermocouple in a conventional manner.

In view of the foregoing, it should be manifest that the device exemplified in FIG. 24 offers a unique setup whereby a pair of entrances or passages, formed by the members 674, afford substantially simultaneous inflow of metal into the chamber of the receiving means as well as into the passages for solidification and that the thermocouple may be utilized to record the temperature of the sample or samples of metal received through the agency of an instrument, such as a potentiometer, as alluded to above. Of further significance is the fact that the thermocouple is supported by the filter and not by the receiving means. Obviously, the thermocouple could be supported by any other suitable means located above the receiving means.

In FIG. 25 there is shown a device 681, which as noted above, is similar to FIG. 17 and includes thermocouple generally designated 682 located in operative relation to a receiving means 683 within the confines of a housing 684. More particularly, the device also includes a cup 685 containing cement 686 which supports a tubular member 687, cups 688 and 689, a cup or cap 690 and a filter 691, all of which respectively correspond to the same components illustrated in FIG. 17. The receiving means is formed to provide a chamber and the tubular member 687 forms a passage which communicates with the chamber and may also receive a sample of molten metal for analysis.

The thermocouple 682 is shown as being disposed in an elongated tube 692 which extends through the filter 691, the receiving means 683 and the cement 686, and through an opening provided therefor in a bottom wall of the upper cup 685. It should be noted that the tube 692 is supported at least in part by the filter and by a supporting wall 693 which is substantially located in the receiving means and has a lower portion embedded in the cement and an upper portion held by the filter. The tube also has an intermediate portion embedded in the cement and its lower end is preferably supported on a bottom wall of the cup 688. The thermocouple has an upper extremity secured in the lower end of the tube and a lower extremity which extends through an aperture provided therefor in a bottom wall of the cup 688 for disposition in a chamber 694 formed by the cup 689. A conduit 695 extends downwardly through the housing 684 and into the tube 692 and contains a pair of lead-in conductors which are connected to the wires of the thermocouple in a conventional or well known manner.

The tube 692 may be constructed of any material suitable for the purpose, but is preferably made from a frangible material such as glass. Attention is directed to the fact that FIG. 17 shows a pair of tubular members 553 embedded in cement for communicative connection with a chamber of the receiving means and that FIG. 25 is distinguishable therefrom in that it shows a pair of tubular members of a dissimilar character in which the member 687 is short and the tube or tubular member 692 is appreciably longer and utilized in lieu of a member corresponding to members 687.

When the device 681 is dipped or immersed into a bath of hot liquid, such as molten metal, the cup or cap 690 will blow or at least partially disintegrate and the deoxidizing element carried by the cup 689 will melt and allow metal to flow into the chamber 694 and about the lower extremity of the thermocouple as well as through an opening provided in a bottom wall of the cup 688, into a chamber 696 formed by the cup 688 and into the chamber of the receiving means 683 via the tubular member or passage 687 so that the temperature of the metal flowing into the chambers 694 and 696 and about the thermocouple may be readily ascertained. The recording of the voltage for temperature purposes may, in point of time, first occur while the metal is circulating in the chamber 694 or in this chamber and chamber 696 or when metal enters the receiving means 683. The filter 691 serves to retain a molten metal sample in the receiving means 683 and allow air to vent into the atmosphere through the upper open end of the housing 684. It should be noted that metal may solidify in the receiving means 683, the tubular member 687, chamber 696 and/or chamber 694 whereby to obtain one or more samples or portions of a sample for analysis.

In FIG. 26 of the drawing, there is illustrated a device 700 which includes all of the components or parts corresponding to those shown in FIG. 25 above described, the only material difference between the device in FIG. 25 and FIG. 26 being in the location of a thermocouple generally designated 701 located in a housing 702. More specifically, the structure exemplified in FIG. 26 is provided with a plurality of cups 703, 704, 705 and a cup or cap 706 which respectively correspond to the cups 685, 688, 689 and the cup or cap 690 of FIG. 25. It will be noted that the bottom walls of the cup 703 and 704 are respectively provided with aligned openings 707 and 708 and that the bottom wall of the cup 705 with an aperture 709. The thermocouple 701 is supported in a tube 710 in substantially the same manner that the thermocouple 682 is supported in the tube 692 of the device shown in FIG. 25. It will be observed that the tube 710 extends through the aligned openings 707 and 708 with the lower end of the tube resting on a bottom wall of the cup 705 so that a lower extremity of the thermocouple will extend through the aperture 709 for disposition in a chamber 711 formed by the cup or cap 706. It should be noted that in FIG. 26 a supporting wall, such as the wall 693 in FIG. 25 is not included as a part of the structure shown in FIG. 26. A conduit 712 containing a pair of insulated lead-in conductors are adapted for connection to the wires of the thermocouple and to a recording apparatus located remote from the device as explained above.

In view of the foregoing, it should be readily apparent that when the device 700 is dipped or immersed in a bath of hot liquid, such as molten metal, the cup or cap 706 will blow or at least partially disintegrate and melt the deoxidizing element carried by the cup 705 so that the liquid will flow into the chamber 711, a chamber 713 formed by the cup 705, a chamber 714 formed by the cup 704 and into a receiving means 715 via a tubular member 716 for solidification as described above in connection with the device 681. The metal flowing into the chambers 711, 713 and 714 surrounds the thermocouple 701 so that the temperature thereof, as explained above, may be readily ascertained.

FIG. 27 depicts a modified device 717 having an elongated tubular cylindrical housing 718 which has an internal diameter or cross-dimension greater than the majority of the housings above referred to, so that a subassembly or unit comprising structure generally designated 719 and a lower sleeve or insert 720 carrying 719 may be readily inserted and connected to or within the confines of the housing by any means suitable for the purpose, such as an adhesive or staples.

More specifically, the structure 719 preferably comprises a plurality of cups 721, 722, 723 and a cup or cap 724 which substantially respectively correspond to the cups 703, 704, 705 and the cup or cap 706 of the device shown in FIG. 26. The cups of the device 717 preferably have rims which bite or otherwise engage an internal cylindrical surface of the sleeve 720 for anchoring the cups therein. The cup 721 contains cement 725 and serves to anchor a receiving means 725 in relation to the cup and so that a tubular member or extension 726 thereof extends through a bottom wall of the cup 721 into a chamber 727 formed by the adjacent cup 722. A cylindrical tube 728 is partially embedded in the cement 725 and extends through the cup 721 and has a lower end resting on a bottom wall of the cup 722. A tubular member 729 surrounds the receiving means 725 and the tube 728 and has a lower end embedded in the cement 725 whereby to assist in stabilizing the position of the receiving means and tube 728. A tubular element 730 preferably made from a suitable frangible material is disposed in the tube 728 and a lower extremity thereof extends through axially aligned openings respectively provided in the bottom walls of the cups 722 and 723 so that a lower end of the element finds support on a bottom wall of the cup or cap 724. A thermocouple 731 is disposed in the tubular element 730 and in the tube 728 so that portions of the thermocouple are located in the chamber 727, a chamber 732 formed by the cup 723 and in a chamber 733 formed by the cup or cap 724.

The device 717 is adapted to be dipped or immersed in a bath of hot liquid, such as molten metal, and this causes the cup or cap 724 to blow or at least partially disintegrate and melt the deoxidizing element carried by the cup 723 so that metal will successively flow into the chambers 733, 732 and 727 and about the thermocouple so that the temperature of the metal may be readily ascertained while the metal is also flowing into the receiving means 725.

A conduit 734 is disposed in the housing 717 and contains insulated conductors which extend into the tube 728 and element 730 for connection with wires of the thermocouple in a conventional manner. The conductors in the conduit 734 are connected to a male plug 735 for detachably assembly with a female plug 736. A conduit 737 contains insulated conductors which are connected to the plug 736 and are adapted for extension outwardly through a tubular wand or handle 738, the latter of which is adapted for detachable reception or connection with a means such as a receiving means or upper tubular insert or sleeve 739 which, if so desired, may be anchored in place in the same manner as the lower sleeve 720. In assembling the components of the device, the conduit 737 carrying the female plug 736 is first inserted downwardly through the wand 738 and housing so that the plug 736 may be connected to the male plug 735, after which the subassembly or unit comprising the structure 719 and lower sleeve 720 are inserted into the lower end of the housing and then secured in place. The upper insert 739 may be inserted into the upper end of the housing and secured in place prior to or after the unit is secured in place.

As alluded to above, the internal diameter or cross-dimension of the housing 718 is somewhat greater than the internal diameter or cross-dimension of the majority of the housings described above so that the structure 719 may be housed in a sleeve 720 and the unit comprising the structure 719 or sleeve 720 may as a unit be inserted into and secured in the lower end of the housing. This organization is unique in that the majority of the structures above described which have an overall cross-dimension corresponding to the structure 719 may be housed in a sleeve like 720 for securement in a housing having a diameter or size corresponding to the housing 718.

Attention is also directed to the fact that the upper sleeve 739 is of substantially the same diameter as the lower sleeve 720 and the sleeve 739 is unique in that it provides a receiving means having an internal diameter or dimension whereby to accommodate a wand 738, the latter of which, for example, may also be utilized for connection with a majority of the housings of the devices described above. More specifically, the upper sleeve 739 and lower sleeve 720 compensate for the difference in the internal diameter of the housing 718 so that the wand 738 which is adapted for use in conjunction with the majority of the housings above referred to may also be utilized for manipulating the device 717 and so that the structure 719 may be inserted into the housing 718 by utilizing the lower sleeve 720 in lieu of securing, for example, a structure such as 719 for direct connection in a housing in which the rims of the cups engage an internal surface thereof.

FIG. 28 is a vertical section of a modified device 740 which includes the structure shown in FIG. 12 and a pair of thermocouples whereby the temperature of the metal at different locations may be recorded while metal is flowing into a pair of receiving means. More particularly, the device shown in FIG. 28 comprises a housing 741 and a subassembly comprising cups 742, 743, 744 and a cup or cap 745 which respectively correspond to the cups 407, 410, 412 and the cup or cap 414 of FIG. 12. The subassembly or unit is adapted to be pressed into the housing so that the rims of the cups 742, 743, 744 will engage an inner cylindrical surface of the housing as described above.

The upper cup 742 contains cement 746 and a pair of tubes 747, corresponding to the tubes 405 and 406 in FIG. 12, are embedded in the cement and their lower ends project through openings provided therefor in a bottom wall of the cup 742 for communication with a chamber 748 formed by the cup 743 and their upper ends respectively communicate with a pair of receiving means 749 and 749' which are preferably stabilized in their position by a tube 750. The lower extremity of this tube is embedded in the cement and its upper extremity surrounds the receiving means 749 and 749' as clearly shown. The tubes 747 provide passages communicatively connecting the entrances of the receiving means with the chamber 748.

It will be observed that the bottom wall of the upper cup 742 is provided with an aperture 751, the bottom wall of the cup 743 with an aperture 752, and the bottom wall of the cup 744, with an aperture 753. These apertures are aligned and an aperture 752' affords communication between the chamber 748 and a chamber 754 formed by the cup 744.

A thermocouple generally designated 755 is disposed in a tubular element 756, the latter of which is located in the tube 750 and extends downwardly through a hole provided therefor in the cement 746 and through the aligned apertures 751 and 752 and rests on the bottom wall of the cup 744 and a lower extremity of the thermocouple extends through the aperture 753 of the cup 744 for disposition in a chamber 757 formed by the cup or cap 745.

The wires of the thermocouple are joined to a pair of conductors contained in a conduit 758 and connect with a female plug 759 and the latter of which is adapted for connection with a male plug 760 secured to conductors within a conduit 761 adapted for extension upwardly through the housing and/or a wand in order that they may be connected to a recording apparatus disposed at a location remote from the device.

The device shown in FIG. 28 also preferably utilizes a thermocouple generally designated 762 which may be operatively associated with the receiving means 749 in a mode substantially corresponding to that as exemplified in FIGS. 20 or 23. More specifically in this respect, a conduit 763 containing conductors extends upwardly and the lower ends of the conductors are connected to the wires of the thermocouple 755 and their upper ends to a male plug 764 which is adapted for detachable connection with a female plug 765. A conduit 766 contains conductors and these conductors are connected to the male plug and are adapted for extension, for example, upwardly through the upper open end of the housing for connection with a recording apparatus substantially in the same way that the conductors in the conduit 761 are connected.

As alluded to above, the device 740 above described offers a unique setup whereby a pair of samples of molten metal may be obtained while temperatures thereof at different locations in the device are being recorded. It should be observed that one of the thermocouples does not extend in the receiving means and is so disposed that the temperature of metal initially entering the device may be recorded prior to entry of metal into one of the receiving means. It is to be understood that this unique organization of components is not limited to the use of a thermocouple with a pair of identical receiving means as shown. Otherwise expressed, the receiving means may be of corresponding or dissimilar characters as exemplified, for example, in FIGS. 12 through 16.

More particularly, attention is directed to the fact that one of the thermocouples is positioned in one of the receiving means whereby to ascertain at the freezing point of the sample the carbon content of the sample and the other thermocouple is disposed to determine the temperature of the metal entering the sampling device which is assumed to be the actual temperature of the bath of the molten metal surrounding the device.

Having thus described my inventions, it is obvious that various modifications may be made in the same without departing from the spirit of the inventions, and therefore, I do not wish to be understood as limiting myself to the exact forms, construction, arrangements, and combinations of parts herein shown and described.

I claim:

1. A device for obtaining samples of molten metal comprising: a housing having a chamber and provided with means forming a lower chamber, a pair of receiving means having upper and lower portions, means for securing said lower portions to said housing so that said upper portions extend into said housing chamber in a juxtaposed relationship, said receiving means being respectively provided with entrances communicating with said lower chamber whereby when the device is dipped into a bath of molten metal samples thereof will flow through said entrances from said lower chamber into said receiving means and when the device is removed from the bath the samples will solidify, and a thermocouple operatively associated with at least one of said receiving means.

2. The device defined in claim 1, in which said receiving means are of different sizes.

3. The device defined in claim 1, in which said securing means is of an insulating character and common to both of said receiving means.

4. The device defined in claim 1, in which one of said receiving means is of a spindle-like character and the other includes a head forming a chamber with a passage leading thereto.

5. The device defined in claim 1, in which one of said receiving means is of a spindle-like character and said thermocouple is carried thereby.

6. The device defined in claim 1, in which said receiving means are of a different character and have different lengths.

7. The device defined in claim 1, in which said lower chamber is formed by a protective enclosure which normally conceals said entrances, and means are provided for conditioning the molten metal prior to its flow into said receiving means.

8. The device defined in claim 1, in which said housing is of a non-metallic material and protected by a shield of heat-resistant material.

9. The device defined in claim 1, in which one of said receiving means is provided with filter means and a vent for controlling the venting of air therefrom.

10. The device defined in claim 1, in which said housing is protected by shield of heat-resistant material.

11. A method of obtaining samples of molten metal which comprises: immersing a device having a housing with a pair of receiving means connected thereto and openings respectively leading to said receiving means from an entrance chamber common to said openings and a thermocouple is associated with one of said receiving means, into a bath of molten metal whereby samples of the latter will flow from said chamber through said openings into said receiving means and activate the thermocouple, removing the device from the bath and allowing the samples to solidify, disconnecting the receiving means and samples from the housing, and then removing the receiving means from the samples.

12. A device for obtaining samples of molten metal comprising: a housing, a pair of receiving means having upper and lower portions, means for supporting said receiving means in said housing whereby to provide a space substantially surrounding said upper portions, a thermocouple operatively associated with at least one of said receiving means, means providing a chamber, said receiving means being respectively provided with entrances which are common to and communicate with said chamber whereby when the device is dipped into a bath of molten metal some of the latter will flow into said entrances via said chamber into said receiving means and activate said thermocouple and when the device is removed from the bath the metal received will solidify to produce samples.

13. A device for obtaining samples of molten metal comprising: a housing, receiving means, means for supporting said receiving means in said housing, a thermocouple extending into said receiving means, means providing a chamber, a pair of entrances communicating with said receiving means whereby when the device is dipped into a bath of molten metal some of the latter will flow into said entrances via said chamber into said receiving means and activate said thermocouple and when the device is removed from the bath the metal received will solidify to produce samples.

14. A device for obtaining samples of molten metal comprising: a housing, a pair of unevacuated receiving means respectively provided with tubular means, means for supporting said receiving means and said tubular means in fixed relation to one another to said housing, a thermocouple extending into one of said receiving means, means common to and temporarily protecting said tubular means, the arrangement being such that when the device is dipped into a bath of molten metal at least some of the common means will be destroyed so that some of the metal will simultaneously flow through said tubular means into said receiving means to activate said thermocouple and when the device is removed from the bath the metal received will solidify to produce samples.

15. A device for obtaining samples of molten metal comprising: an elongated tubular housing, a pair of frangible unevacuated receiving means having upper portions and lower portions, a pair of tubular means respectively communicating with said receiving means, means common to and securing said tubular means in said housing, said tubular means assisting to support said receiving means so that a space substantially surrounds said upper portions, structure defining chamber means which is common to said tubular means, the arrangement being such that when the device is dipped into a bath of molten metal some of the latter will flow into said chamber means and through said tubular means into said receiving means and when the device is removed from the bath the metal received will solidify to produce samples, and a thermocouple responsive to the inflow of metal into said receiving means.

16. A device of the kind described, said device comprising a housing, a pair of frangible unevacuated receiving means highly resistant to heat fixedly secured in a lower part of said housing, means providing a chamber adjacent said lower part, each of said frangible means having an inlet communicating with said chamber for freely receiving from said chamber a liquid having a high temperature, a thermocouple responsive to the inflow of liquid, and said housing having an upper part whereby a handle may be attached thereto to facilitate dipping of the device into a liquid.

17. A device for obtaining samples of molten metal comprising: a housing having a chamber, a pair of receiving means, means common to and supporting said receiving means in said chamber, a thermocouple extending into one of said receiving means, said receiving means being respectively provided with entrances whereby when the device is dipped into a bath of molten metal some of the latter will flow through said entrances into said receiving means and activate said thermocouple and when the device is removed from the bath the metal received will solidify to produce samples, and means common to said entrances for temporarily protecting them when the device is dipped into the bath.

18. A device for obtaining samples of molten metal comprising: a housing, a pair of receiving means, means for supporting said receiving means in said housing, means providing a chamber, said receiving means being respectively provided with entrances which are smaller than an interior dimension of said receiving means and communicate with said chamber whereby when the device is dipped into a bath of molten metal some of the latter will flow into said entrances via said chamber into said receiving means and when the device is removed from the bath the metal received will solidify to produce samples, and a thermocouple disposed in responsive relation to the inflow of metal.

19. A device for obtaining samples of molten metal comprising: a housing, a pair of receiving means respectively provided with tubular means, means supporting said receiving means and said tubular means in relation to one another and said housing, a chamber common to said tubular means, a thermocouple extending into one of said receiving means, the arrangement being such that when the device is dipped into a bath of molten metal some of the latter will flow from said chamber through said tubular means into said receiving means to activate said thermocouple and when the device is removed from the bath the metal received will solidify to produce samples.

20. A device of the kind described, said device comprising a housing having a chamber in a lower part thereof, a pair of frangible unevacuated receiving means highly resistant to heat fixedly secured in said chamber, a thermocouple extending into one of said receiving means, each of said frangible means having an inlet adjacent said lower part for freely receiving a liquid having a high temperature, and means common to said inlets for temporarily protecting the same when the device is dipped into a liquid.

21. A device of the kind described, said device comprising a housing, a pair of frangible unevacuated receiving means highly resistant to heat fixedly secured in a lower part of said housing, means providing a chamber adjacent said lower part, each of said frangible means having an inlet communicating with said chamber for freely receiving from said chamber a liquid having a high temperature, a thermocouple disposed in responsive relation to the inflow of liquid, and said housing having an upper part whereby a handle may be attached thereto to facilitate dipping of the device into a liquid.

22. A device for obtaining samples of molten metal comprising: a housing, a pair of receiving means, means for connecting said receiving means to said housing, a thermocouple extending into one of said receiving means, said receiving means being respectively provided with entrances, and means common to and protecting said entrances for a temporary period when the device is dipped into molten metal and so that at least a portion of this means will be destroyed in order to facilitate the flow of some of the metal substantially simultaneously into said receiving means via said entrances whereby to activate said thermocouple and produce solidified samples after the device is removed from the bath.

23. A device for obtaining samples of molten metal comprising: a support, a pair of receiving means, means for connecting said receiving means to said support, structure providing a chamber, said receiving means being respectively provided with entrances which are common to and communicate with said chamber whereby when the device is dipped into a bath of molten metal some of the latter will flow into said entrances via said chamber into said receiving means and when the device is removed from the bath the metal received will solidify to produce samples, and a thermocouple responsive to the inflow of metal.

24. A device for obtaining samples of molten metal comprising: a housing having a chamber, a pair of receiving means, a thermocouple extending into one of said receiving means, means supporting said receiving means in relation to said chamber, said receiving means being respectively provided with entrances, and means common to and temporarily protecting said entrances whereby when the device is dipped into a bath of molten metal at least a portion of said common means will be destroyed whereby to facilitate the flow of some of the metal substantially simultaneously through said entrances into said receiving means to activate said thermocouple and when the device is removed from the bath the metal received will solidify to produce samples.

25. A device of the kind described comprising: a support, a pair of receiving means connected to said support for receiving samples of molten metal, a thermocouple extending into one of said receiving means, said receiving means being respectively provided with inlets, and means common to said inlets for temporarily protecting them when the device is dipped into a bath of molten metal.

26. The device defined in claim 25, in which said common means comprises a cap substantially covering said inlets.

27. The device defined in claim 25, in which said common means comprises a plurality of members which are common to said inlets for temporarily protecting said inlets when the device is dipped into a bath of molten metal.

28. A device for obtaining samples of molten metal comprising: a housing having a chamber, a pair of receiving means, a thermocouple extending into one of said receiving means, means common to and supporting said receiving means in said chamber, inlet means common to and communicating with said receiving means, and means common to said inlet means for temporarily protecting the same when the device is dipped into a bath of molten metal and so that when at least some of the common means is destroyed some of the metal may simultaneously flow into said receiving means via said inlet means and activate said thermocouple.

29. A device for obtaining samples of molten metal comprising: a housing having a chamber, a pair of receiving means, a thermocouple extending into one of said receiving means, means common to and supporting said receiving means in said chamber, said receiving means being respectively provided with entrances whereby when the device is dipped into a bath of molten metal some of the latter will simultaneously flow into said receiving means via said entrances and activate said thermocouple and so that the metal received may solidify after the device is withdrawn from the bath, and means common to said entrances for modifying the composition of some of the molten metal prior to its entry into said receiving means.

30. A valveless device of the kind described comprising: a housing provided with an upper chamber and a lower chamber, a pair of inlet passages continuously communicatively connecting said chambers whereby when the device is dipped into a hot liquid some of the latter will first flow into said lower chamber and then into said upper chamber for solidification via said passages, and a thermocouple extending into one of said chambers.

31. A device of the kind described comprising: a housing having a lower imperforate wall defining a tubular end, receiving means disposed in said housing for receiving and solidifying a sample of molten metal, a plurality of longitudinally extending passages leading to said receiving means whereby when the device is immersed in a bath of molten metal quantities of the metal will flow longitudinally and simultaneously into said passages and then into said receiving means via said end, and a thermocouple disposed in said tubular end.

32. A subassembly comprising a cup having a bottom wall provided with a pair of openings, a mass of cement disposed in said cup, said mass being provided with a pair of passages respectively communicating with said openings, means disposed in relation to said cup which is common to said passages for temporarily protecting the latter, and a thermocouple disposed in one of said passages.

33. A method which comprises dipping a device having a receiving means provided with a chamber having a thermocouple therein and a pair of passages communicating therewith into a hot liquid whereby some of the latter will freely flow simultaneously through the passages into the chamber to activate said thermocouple and obtain a sample thereof, removing the device and sample from the liquid, and then allowing the liquid to cool and solidify in said receiving means and said passages to provide a sample having a mass formed by said receiving means and a pair of closely associated portions formed by said passages which are joined to said mass at a localized area thereof and extend in the same direction therefrom.

34. A method which comprises dipping a frangible receiving means having a chamber containing a thermocouple and provided with a pair of passages communicating with a bottom thereof into a bath of a molten metal whereby some of the latter will flow through the passages into said chamber to activate the thermocouple and obtain a sample thereof, removing the receiving means and sample from the bath for cooling, and then breaking the receiving means to obtain the sample.

35. A device of the kind described comprising: a housing provided with receiving means, a thermocouple extending into said receiving means, a cup connected to said housing and having a bottom wall provided with openings, a pair of tubular means communicatively connected to said receiving means, a mass of cement embedding said tubular means in said cup and in registry with said openings so that when the device is dipped into a hot liquid some of the latter will flow into said receiving means via said tubular means to activate said thermocouple.

36. The device defined in claim 35, in which said receiving means comprises a wall structure defining a chamber, and said wall structure is protected by a sheath of insulating material.

37. The device defined in claim 35, in which said housing is provided with a space above said receiving means, and filter means is disposed in said space.

38. The device defined in claim 35, in which said cup, said tubular means and cement constitute a unit which is pressible into said housing to locate said tubular means in communication with said receiving means.

39. A device of the kind described comprising: imperforate wall structure forming a support having a lower tubular end, receiving means carried by said support and provided with a thermocouple and pair of inlets through which a hot liquid may enter said receiving means via said end when the device is dipped into such a liquid to activate said thermocouple, and means common to and supported in relation to said inlets for conditioning at least some of the liquid prior to its entry into said inlets and solidification in said receiving means.

40. A device for obtaining samples of molten metal, said device comprising a support, a pair of insulated receiving means carried by said support, and entrance means common to and communicating with said receiving means whereby when the device is dipped into a bath of molten metal some of the latter after entering said entrance means will initially flow simultaneously into the said receiving means for solidification, and a thermocouple operatively associated with one of said receiving means.

41. A device for obtaining samples of molten metal comprising: a housing having a chamber, a pair of receiving means, means common to and supporting said receiving means in a side-by-side relation in said chamber, and entrance means common to and communicating with said receiving means whereby when the device is dipped into a bath of molten metal some of the latter after entering said entrance means will initially flow simultaneously into said receiving means so that the metal received may solidify after the device is withdrawn from the bath, and a thermocouple carried by said device and disposed in a responsive relation to the inflow of metal.

42. An elongated device of the kind described comprising: a support having a lower tubular end, receiving means disposed in said support and provided with a pair of inlets through which a hot liquid may enter when the device is dipped into such a liquid, means supported in relation to said inlets provided with entrance means common to said inlets for initially receiving some of the liquid through said end prior to its flow into said inlets, and a thermocouple disposed in said lower end in responsive relation to the inflow of liquid.

43. The device defined in claim 42, in which said inlets are tubular and the liquid received in said receiving means forms mass means, and the liquid in said pair of tubular inlet means may solidify to form a pair of closely associated spindle-like portions which are joined to said mass means at a localized area thereof and extend in the same direction therefrom.

44. The device defined in claim 42, in which the metal solidified in both of said receiving means forms opposed mass means and some of the metal may solidify in said entrance means to form a pair of spindle-like portions joining mass means.

45. A device for obtaining samples of molten metal comprising: a housing, receiving means, means for supporting said receiving means in said housing, means providing a chamber, a first passage communicating with said receiving means and said chamber and a second passage communicating with said chamber, a thermocouple disposed in said second passage, the arrangement being such that when the device is dipped into a bath of molten metal some of the latter will flow into said first passage via said chamber into said receiving means and into said second passage to activate said thermocouple and when the device is removed from the bath the metal received will solidify to produce samples.

46. A device for obtaining a sample of molten metal comprising: a housing, unevacuated receiving means, a first tubular means communicating with said receiving means and second tubular means, a thermocouple, means for supporting said receiving means and said tubular means in fixed relation to one another to said housing, means common to and temporarily protecting said tubular means, the arrangement being such that when the device is dipped into a bath of molten metal at least some of the common means will be destroyed so that some of the metal will simultaneously flow through said first tubular means into said receiving means and about said thermocouple and when the device is removed from the bath the metal received will solidify to produce samples.

47. A device of the kind described comprising: a housing, means for receiving molten metal disposed in said housing, a thermocouple disposed in said housing externally of said receiving means, means common to and supporting said receiving means and said thermocouple in a fixed relationship, and means common to said receiving means and said thermocouple for temporarily protecting the same when the device is dipped into a bath of molten metal.

48. A device of the kind described comprising: a housing, means disposed within the confines of said housing for receiving a sample of molten metal, a thermocouple having at least a portion thereof disposed in said receiving means, and means for supporting said thermocouple independently of said receiving means.

49. A device of the kind described comprising: a housing, means mounted in said housing forming a chamber for receiving a sample of molten metal, means disposed in said housing forming a second chamber for receiving molten metal, a pair of passages communicatively connecting said chambers so tat when the device is dipped into a bath of molten metal some of the latter will flow through one of the chambers into the other chamber via said passages, and a thermocouple having at least a portion thereof disposed centrally in one of said chambers.

50. A device of the kind described comprising: a housing, means providing an upper chamber in said housing for receiving a sample of molten metal, means providing a plurality of communicatively connecting chambers for receiving molten metal, a passage directly communicatively connecting said upper chamber with one of the lower chambers, tubular means extending through said upper chamber and into at least one of said lower chambers, and a thermocouple carried by said tubular means and having at least a portion thereof disposed in one of said lower cambers.

51. The device defined in claim 50, in which said portion of said thermocouple is located in the lowermost of said lower chambers.

52. A device of the kind described comprising: a housing, a pair of means disposed in said housing and having entrances for substantially simultaneously receiving samples of molten metal, a thermocouple disposed in said housing, and means for temporarily protecting said entrances and said thermocouple when the device is dipped into a bath of molten metal.

* * * * *